B. S. CHILSON.
MOTOR CYCLE.
APPLICATION FILED JULY 22, 1914.

1,254,883.

Patented Jan. 29, 1918.

UNITED STATES PATENT OFFICE.

BERT S. CHILSON, OF FAYETTEVILLE, NEW YORK.

MOTOR-CYCLE.

1,254,883.

Specification of Letters Patent.  Patented Jan. 29, 1918.

Application filed July 22, 1914. Serial No. 852,396.

*To all whom it may concern:*

Be it known that I, BERT S. CHILSON, of Fayetteville, in the county of Onondaga, in the State of New York, have invented new and useful Improvements in Motor-Cycles, of which the following, taken in connection with the accompanying drawings, is a full, clear, and exact description.

This invention relates primarily to certain improvements in motor cycles.

The primary object of the invention is to produce a motor cycle which will comfortably and efficiently carry two passengers, side by side, and in this connection to provide separate grasping supports or grips for each passenger, thereby avoiding the necessity of the driver reaching across the vehicle frame in front of the other passenger in order to reach the ordinary grip to efficiently guide and balance the vehicle.

Another object is to provide a suitable and efficient clip for connecting a brace to the ordinary handle bars and for connecting a third grip to this brace, and it is noted that this form of clip is not limited in its usefulness to the particular structure in connection with which it is disclosed, but may be used in any suitable place when desired to connect two parts together.

Another object resides in producing a seat, having portions disposed upon opposite sides of the vehicle frame, the exact structure of which seat is shown, described and claimed in my co-pending application, Serial No. 825,974, except that as here shown, the plate for receiving the spring portion of the seat is provided with a circumferential, upstanding flange upon three sides thereof, thus preventing movement of the spring portion, which abuts upon the fourth side against the seat frame.

Other objects and uses will appear from the following description.

In the drawings—

Figure 1 is a view of a portion of a motor cycle embodying the features of this invention.

Fig. 2 is a cross section on line 2—2, Fig. 1.

Fig. 3 is a view of a portion of the clip.

Fig. 4 is a view of the other portion of the clip.

Fig. 5 is a cross section on line 5—5, Fig. 1.

The invention comprises a seat having seat portions disposed upon opposite sides of the vehicle frame —1— and comprising a seat frame —2— having depressed end portions —3— adapted to receive seat plates —4—, each having an up-standing flange —5—, within which flange is positioned a suitable spring seat member —6—. The seat frame —2— is provided with a projecting portion —7— having an opening to receive the post —8— for attaching the seat to the frame, and preferably the front side of the projection —7— is split and the split portions are provided with suitable registering openings for receiving a bolt —9— for firmly attaching the seat to the frame. This form of seat used in connection with the ordinary handle bars —10— provides nothing which the person who is not driving the vehicle may grasp with his hand to steady himself upon the seat and the vehicle, and further necessitates the driver reaching across the frame in front of the other passenger in order to grasp the handle bar disposed upon that side of the frame, and to avoid this difficulty I provide, in combination with the seat shown, a brace bar —11— extending between the handle bars —10— and connected thereto by means of the clip shown in Figs. 2, 3 and 4. The bar —11— is preferably tubular and one section —12— of the clip is provided with a reduced cylindrical portion adapted to fit within the brace —11— and may be attached thereto in any suitable manner, as by the rivet —13—, and preferably the section —12— is of the same diameter at the point of projection from the brace bar —11— as the brace bar itself, forming with it a continuous surface. The section —12— is further provided with a laterally extending angular seat —14— and a laterally extending semi-cylindrical channel —15— formed therein and terminating in a longitudinally projecting lug —16— having a threaded opening —17— for a purpose hereinafter described. The other wall of the seat —14— terminates abruptly in a square shoulder —18— some distance to the rear of the cylindrical channel —15—.

The other section —19— of the clip is formed with an angular projecting portion —20— adapted to have a lateral sliding engagement in the seat —14— and a laterally projecting shoulder —21— contacting with the squared shoulder —18—. The section —19— is also provided with a semi-cylindrical channel —22— terminating in a longitudinally projecting lug —23— having an opening —24— registering with the opening —17— for the reception of a threaded bolt —25— adapted to draw the sections —12— and —19— of the clip tightly about the handle bars —10—. A third grip —26— is attached to the brace bar —11— preferably centrally thereof, by means of the clip heretofore described, the portion of the grip, to receive the clip is tubular in form exactly like the brace bar —11— and the cylindrical portion of the section —12— fits into it and is connected to it in any suitable manner, as by the rivet —13— and the extending portions of the clip grasp the brace bar —11— and are tightened thereabout in the same manner as about the handle bars —10—. The driver may then grasp one of the grips or handle bars —10— and the bar or grip —26— and the other passenger may grasp the other handle bar or grip —10— for his support.

Preferably, the handle bars or grips —10— and the third grip —26— are each provided in the usual manner with a suitable hard rubber portion at their ends for direct contact with the hand.

Although the spring cushion member —6— may be loosely fitted within the upstanding edge flanges —5— upon the seat plate —4— and the spring may be directly connected to the seat plate, preferably the leather or other confining facing of the seat cushion has at the front and rear of the seat plate suitable straps —27— and —28— attached thereto, said straps adapted to extend downwardly through slots in the seat plate and to be connected to each other beneath the seat plate in any suitable manner as by providing one of the straps with a buckle and the other with openings to receive the buckle tang.

It will now be apparent that although I have shown and described one particular embodiment of the invention, that many changes may be made in the details of construction and in the particular form and relative position of the parts without departing from the spirit of this invention as set forth in the appended claims.

What I claim is:—

1. In a wheeled vehicle having wheels alined from front to rear thereof, the combination with a frame of seats secured thereto and disposed respectively upon opposite sides of said frame and each extending entirely to one side of the point of connection to the frame, a U-shaped steering member mounted on the frame and having its side portions disposed symmetrically upon opposite sides of the frame and constituting handle bars, and a third handle bar disposed between the two first-named bars and removably secured to the U-shaped steering member.

2. In a wheeled vehicle having wheels alined from front to rear thereof, the combination with a frame, of seats secured thereto and disposed respectively upon opposite sides of said frame and each extending entirely to one side of the point of connection to the frame, a U-shaped steering member mounted on the frame and having its side portions disposed symmetrically upon opposite sides of the frame and constituting handle bars, a cross bar connecting said side portions of the U-shaped steering member, and a third handle bar disposed between the two first-named bars and secured to said cross bar and extending rearwardly and in substantial alinement with said frame.

In witness whereof I have hereunto set my hand this 13th day of July, 1914.

BERT S. CHILSON.

Witnesses:
E. A. THOMPSON,
VIOLA HOWLAND.

Copies of this patent may be obtained for five cents each, by addressing the "Commissioner of Patents, Washington, D. C."